UNITED STATES PATENT OFFICE.

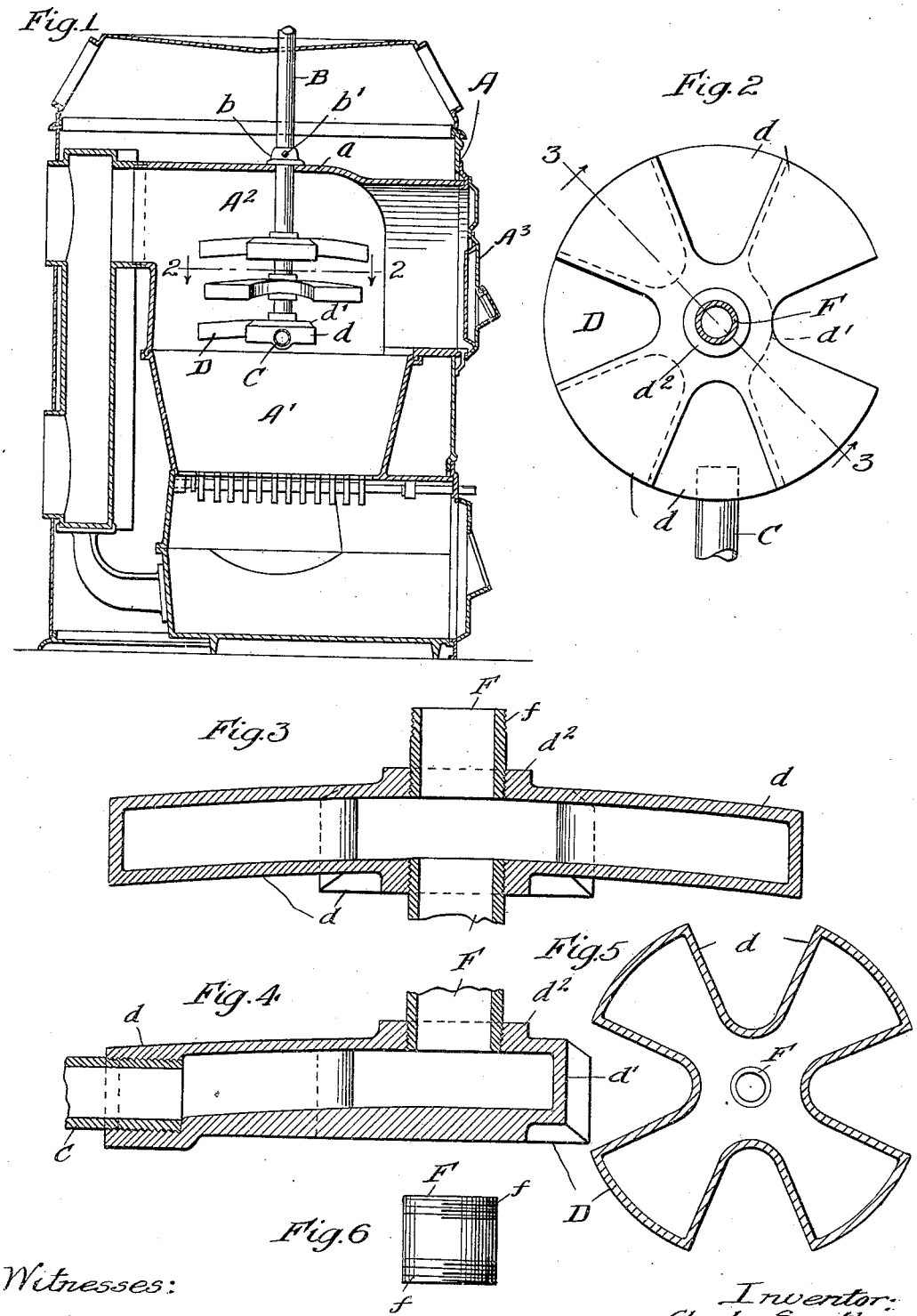

CHARLES SMITH, OF CHICAGO, ILLINOIS, ASSIGNOR TO CHARLES SMITH COMPANY, OF CHICAGO, ILLINOIS, A CORPORATION OF ILLINOIS.

WATER-HEATER ATTACHMENT FOR HOT-AIR FURNACES.

932,065.  Specification of Letters Patent.  Patented Aug. 24, 1909.

Application filed June 27, 1906. Serial No. 323,546.

*To all whom it may concern:*

Be it known that I, CHARLES SMITH, a citizen of the United States, residing in Chicago, in the county of Cook and State of Illinois, have invented a new and useful Improvement in Water-Heater Attachments for Hot-Air Furnaces, of which the following is a specification.

My invention relates to improvements in water heater attachments for hot air furnaces.

The object of my invention is to provide a water heater attachment for hot air furnaces of a simple, efficient and durable construction, capable of being easily and conveniently applied to hot air furnaces of various constructions heretofore in use, and composed or made up of multiple units of like construction, so that the water heater may have any desired heating capacity as may be required in different buildings and in different furnaces, and which will, at the same time, operate economically of fuel.

My invention consists in the means I employ to practically accomplish this object or result; that is to say it consists, in combination with a hot air furnace of any ordinary or suitable construction, of a water heating attachment therefor comprising, in combination with an upright outlet or hot water pipe provided with an adjustable collar for suspending the water heater members in the required relation to the fire chamber and fire pot of the furnace, and provided at the lower end thereof with screw threads for connecting the same with the screw threaded nipple of the upper water heater member, and a plurality of curved or dished and Maltese cross shaped water heater members arranged in staggered relation to each other, and each having screw threaded upper and lower nipples and short screw-threaded connecting pipes for connecting the several members of the heater together, the lower heater member having a truncated front arm opposite the fire door of the furnace, so as to allow admission of fuel properly to the fire pot and enable the fire to be properly attended to or taken care of.

My invention further consists in the novel construction of parts and devices and in the novel combinations of parts and devices herein shown and described.

In the accompanying drawing, forming a part of this specification, Figure 1 is a central vertical sectional view of a hot air furnace provided with a hot water heater attachment embodying my invention; Fig. 2 is a detail section on line 2—2 of Fig. 1; Fig. 3 is an enlarged detail section on line 3—3 of Fig. 2; Fig. 4 is an enlarged detail radial section of the lower heater member, and Fig. 5 is a detail horizontal section through the upper heater member. Fig. 6 is a detail view of the short connecting pipe, one of which is used for connecting each two adjacent heater members.

In the drawing A represents a hot air furnace of any ordinary well known or suitable construction, and having the customary fire pot $A^1$, combustion chamber $A^2$ and fire door $A^3$.

B is the upright hot water or outlet pipe of the water heater attachment, the same extending through a suitable hole bored in the upper wall or dome $a$ of the combustion chamber, and provided with an adjustable supporting collar $b$, having a set screw $b^1$ for fixing it in any desired position on the pipe B, so as to support the water heater in proper relation to the fire pot $A^1$ and combustion chamber $A^2$ for effective operation or heating.

C is the cold water or inlet pipe, the same extending horizontally into the fire chamber of the furnace and connecting with one of the arms $d$ of the lower heater member D.

The water heater is composed of a plurality of curved or dished Maltese cross-shaped heater members D, a greater or less number being used according to the heating capacity desired and the space in the furnace therefor. The heater members D are similarly shaped and duplicates of each other, excepting that the lower heater member has a truncated front arm $d^1$ opposite the fire door, while all the other heater members are of true Maltese cross shape and each have four arms $d$. Each of the heater members D is provided with screw threaded bosses or nipples $d^2$ to receive the threaded ends $f$ of the short connecting pipes F by which the adjacent heater members are connected together. The lower heater member D, the one having the truncated front arm $d^1$, is provided with only one of these screw threaded bosses or nipples, none being required on its lower face. The several heater members D are arranged with their arms $d$ in staggered relation to each other, so that the heater arms $d$ of all the members will be properly exposed to the heat and flame of the combustion chamber and fire pot. The upwardly curved or dished form of the several heater members serves to direct the flame and heat to the central water containing portion of each of the heater members and adds materially to the effective heating operation. The Maltese cross shape of each of the heater members with the arms $d$ thereof, wider at their outer ends, also adds to the heating surface of each of the members, and materially increases the efficiency of the heaters in operation.

As my water heater attachment is composed of similar units or members D, secured together by the removable coupling pipes or connections F, it will be readily understood that in applying the heater to any existing furnace, any desired or required number of heater members may be used, according to the heating capacity required, and to the space available in the furnace.

I claim:

1. In a water heater attachment for hot air furnaces, the combination with the fire pot and combustion chamber of a hot air furnace, of a horizontal inlet or cold water pipe projecting into said combustion chamber above the fire pot, an upright outlet or hot water pipe provided with an adjustable supporting collar engaging the upper wall of the combustion chamber to support the water heating members in their required relation to the fire pot and combustion chamber, and a plurality of upwardly curved or dished, Maltese cross shaped, water heater members centrally connected to and suspended in said combustion chamber from and by said upright hot water pipe, the adjacent members being arranged with their arms in staggered relation to each other, and provided with screw threaded bosses or nipples and short screw threaded connecting pipes for connecting the adjacent members, said heater members having central free and unobstructed chambers communicating with each other through the connecting pipes and into which the radial arms of the members open, substantially as specified.

2. In a water heater attachment for hot air furnaces, the combination with the fire pot and combustion chamber of a hot air furnace, of a horizontal inlet or cold water pipe projecting into said combustion chamber above the fire pot, an upright outlet or hot water pipe provided with an adjustable supporting collar engaging the upper wall of the combustion chamber to support the water heating members in their required relation to the fire pot and combustion chamber, and a plurality of upwardly curved or dished, Maltese cross shaped, water heater members centrally connected to and suspended in said combustion chamber from and by said upright hot water pipe, the adjacent members being arranged with their arms in staggered relation to each other, and provided with screw threaded bosses or nipples and short screw threaded connecting pipes for connecting the adjacent members, the lower water heater member having a truncated front arm opposite the fire door, said heater members having central free and unobstructed chambers communicating with each other through the connecting pipes and into which the radial arms of the members open, substantially as specified.

CHARLES SMITH.

Witnesses:
H. M. MUNDAY,
HENRY LOVE CLARKE.